(12) United States Patent
Lozano Segura et al.

(10) Patent No.: US 10,836,495 B2
(45) Date of Patent: Nov. 17, 2020

(54) PASSENGER SEAT WITH SUSPENDED SEAT DIAPHRAGM

(71) Applicant: Safran Seats USA LLC, Gainesville, TX (US)

(72) Inventors: Rafael Lozano Segura, Denton, TX (US); Jeremy Green, Lantana, TX (US); Kevin M. Waters, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

(21) Appl. No.: 16/220,691

(22) Filed: Dec. 14, 2018

(65) Prior Publication Data

US 2020/0130847 A1    Apr. 30, 2020

Related U.S. Application Data

(60) Provisional application No. 62/749,872, filed on Oct. 24, 2018.

(51) Int. Cl.
*B64D 11/06* (2006.01)
*B60N 2/30* (2006.01)
*A47C 5/04* (2006.01)

(52) U.S. Cl.
CPC ...... *B64D 11/0648* (2014.12); *B64D 11/0639* (2014.12); *A47C 5/043* (2013.01)

(58) Field of Classification Search
CPC .. B64D 11/0639; B64D 11/0648; A47C 5/043
USPC .......................... 297/233, 234, 235, 236, 237
See application file for complete search history.

(56) References Cited

U.S. PATENT DOCUMENTS

| 6,450,579 | B1 | 9/2002 | Nylander et al. |
| 7,396,077 | B2 * | 7/2008 | Boulva ................... A47C 7/282 279/284.2 |
| 7,578,551 | B2 * | 8/2009 | Linero ................... A47C 1/122 297/234 X |
| 8,011,713 | B2 * | 9/2011 | Schlamann .............. B60N 2/01 297/236 X |
| 8,708,410 | B2 * | 4/2014 | Scott ...................... B64D 11/06 297/236 |
| 10,427,552 | B2 * | 10/2019 | Guy ................... B64D 11/0639 |

(Continued)

FOREIGN PATENT DOCUMENTS

WO    2017192875 A1    11/2017

OTHER PUBLICATIONS

Europe Patent Application No. 19203477.5, Extended European Search Report, dated Mar. 17, 2020, 8 pages.

*Primary Examiner* — Rodney B White
(74) *Attorney, Agent, or Firm* — Kilpatrick Townsend & Stockton LLP (57) ABSTRACT

Described are passenger support assemblies for a passenger seat, including an expandable inner frame that attaches the passenger support assembly with a seat frame and an expansion mechanism that allows the expandable inner frame to change in width, and an outer frame that includes two side frame elements connected with the expandable inner frame and extending beyond the expandable inner frame, the outer frame configured to change in width in response to a change in width of the expandable inner frame. A diaphragm can held in tension by the two side frame elements of the outer frame to define a seating surface.

20 Claims, 5 Drawing Sheets

(56) References Cited

U.S. PATENT DOCUMENTS

2012/0326478 A1 12/2012 Blind et al.
2015/0166181 A1* 6/2015 Scott .................. B64D 11/0601
  297/248
2016/0297533 A1* 10/2016 Le ..................... B64D 11/0647

* cited by examiner

PASSENGER SEAT WITH SUSPENDED SEAT DIAPHRAGM

CROSS REFERENCE TO RELATED APPLICATIONS

This application is related to and claims priority benefits from U.S. Provisional Application Ser. No. 62/749,872 ("the '872 application"), filed on Oct. 24, 2018, entitled "Suspended Seat Diaphragm System." The '872 application is hereby incorporated in its entirety by this reference.

FIELD OF THE INVENTION

The field of the invention relates to passenger seats.

BACKGROUND

In commercial aircraft, seats are designed to meet the needs of passenger safety and comfort, while accounting for strict limitations on weight and space. In existing aircraft designs, passenger seats are designed with rigid supportive structures to meet safety criteria, with heavy foam cushioning to provide a supportive seating surface for passengers and to protect passengers against injury over long travel times, as well as in the event of impact or turbulence. However, added weight reduces aircraft efficiency, therefore improved solutions for passenger seating are needed.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, a passenger support assembly for a passenger seat can include an expandable outer frame with a diaphragm held in tension by the outer frame to form a seating surface. In some embodiments, the passenger support assembly can include an inner frame that includes at least two attachment elements separated by a variable, first nonzero distance and configured to attach with a seat frame, and at least one linkage connecting the two attachment elements and configured to space the two attachment elements apart from each other. The inner frame is then attached to two side elements of the outer frame, so that expanding the inner frame expands the outer frame and tensions the diaphragm. In some other embodiments, the inner frame includes expansion elements near a periphery of the inner frame, so that the two attachment elements are fixed with respect to each other while the expansion elements allow the inner frame to expand, thus expanding the outer frame to tension the diaphragm.

The attachment elements can be configured to connect directly to a pair of tubular supports of the seat frame at a seat bottom position. In some embodiments, the assembly can further include an articulating linkage connected with the expandable inner frame and movably mountable with respect to the seat frame, so that the articulating linkage allows the assembly to articulate forward and aft with respect to the seat frame. In some embodiments, as with a passenger seat having an articulating seat bottom that moves in tandem with a reclining seat back, the assembly can include pivoting attachment elements to connect the passenger support assembly with a seat back.

According to certain embodiments of the present disclosure, a passenger seat for a passenger cabin, e.g. an aircraft cabin or similar, can include a seat frame configured to attach to a passenger compartment floor having a passenger support assembly as described above connected with the seat frame. Further, the passenger seat can have a static seat bottom or an articulating seat bottom. In embodiments having an articulating seat bottom, the passenger support assembly can be connected with a lower portion of a reclining seat back by articulating linkages, such that the seat bottom and seat back move in concert to support a passenger. In some embodiments, the seat back can also include a supportive tensioned diaphragm installed therein in a similar manner to the diaphragm of the passenger support assembly.

According to certain embodiments of the present disclosure, a method of installing a passenger support assembly in a passenger seat can include connecting an expandable inner frame with a seat frame of a passenger seat assembly by connecting attachment elements of the expandable inner frame with the seat frame, and connecting an outer frame that includes first and second side frame elements with the expandable inner frame. A diaphragm can be connected with the first and second side frame elements of the outer frame to form a passenger support assembly as described above, and the inner frame and outer frame and outer frame can be expanded until the outer frame places the diaphragm in tension, such that the diaphragm forms a seating surface.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide passenger support assemblies for passenger seats. While the passenger support assemblies are discussed for use with aircraft seats, they are by no means so limited. Rather, embodiments of the passenger support assemblies may be used in passenger seats or other seats of any type or otherwise as desired.

Figure 1:
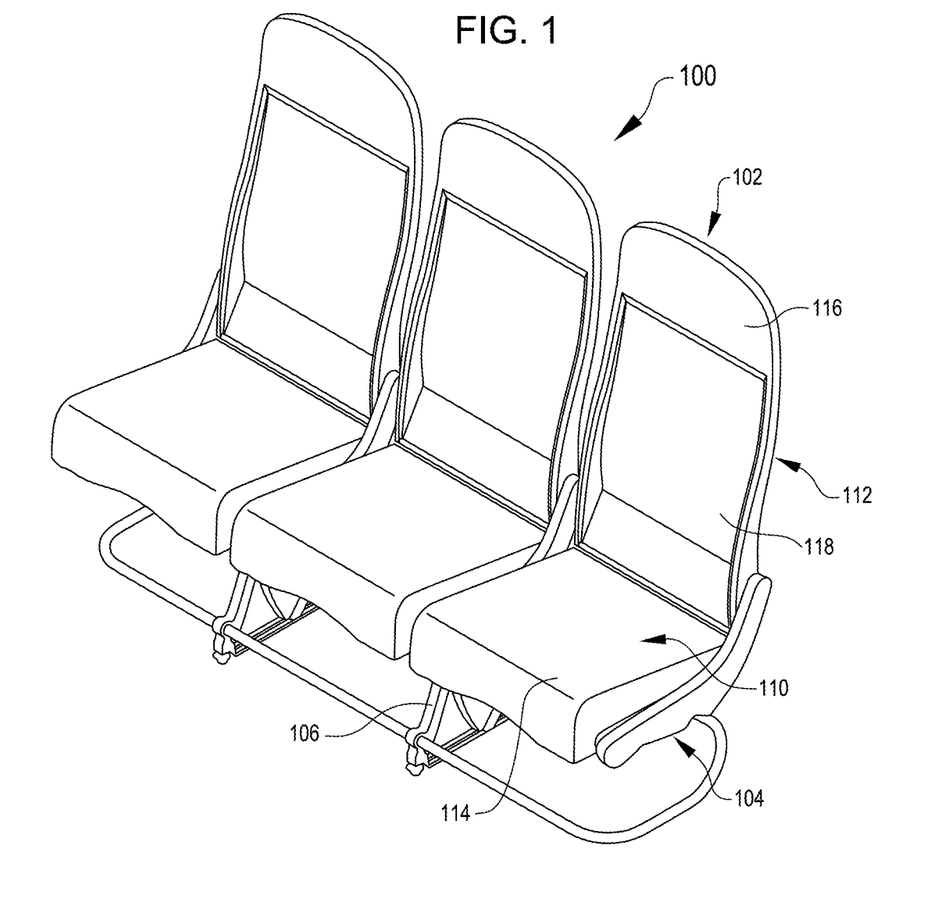
FIG. 1 is a perspective view of a seating arrangement including passenger seats having passenger support assemblies with a suspended seat diaphragm, according to certain embodiments of the present disclosure.

According to certain embodiments of the present invention, as shown in FIG. 1, a passenger seating arrangement 100 can include passenger seats 102 that include seat back 112 and passenger support assembly 110 defining the seat bottom supported by a seat frame 104. The passenger support assembly 110 is connected with a base frame 106 of the seat frame 104, and includes among other features a supported diaphragm 114 that can define a variable-size seating surface, or can be modified to accommodate design widths of various sizes. For example, according to some embodiments, the seating surface defined by the passenger support assembly 114 can be adjustable by at least 8.9 cm (3.5 inches), preferably at least 12.7 cm (5 inches), in response to varying the width of the outer frame. In some embodiments, the wherein the seating surface defined by the passenger support assembly 114 is adjustable in width from 39.4 cm to 47 cm (15.5 to 18.5 inches), preferably from less than 38 cm to at least 50 cm (15-20 inches). The passenger seats 102 can include a seat back 112 having a seat back frame 116 supporting a diaphragm 118. These supported diaphragm-based passenger support and seat back surfaces can replace conventional foam cushioning and solid surfaces of traditional seat pans and seat backs, both improving passenger comfort and reducing the overall weight of the passenger seat 102. Specific details of the passenger support assembly 114 and seat back diaphragm 118 are described below with reference to FIGS. 2-5 and 6, respectively.

Figure 2:
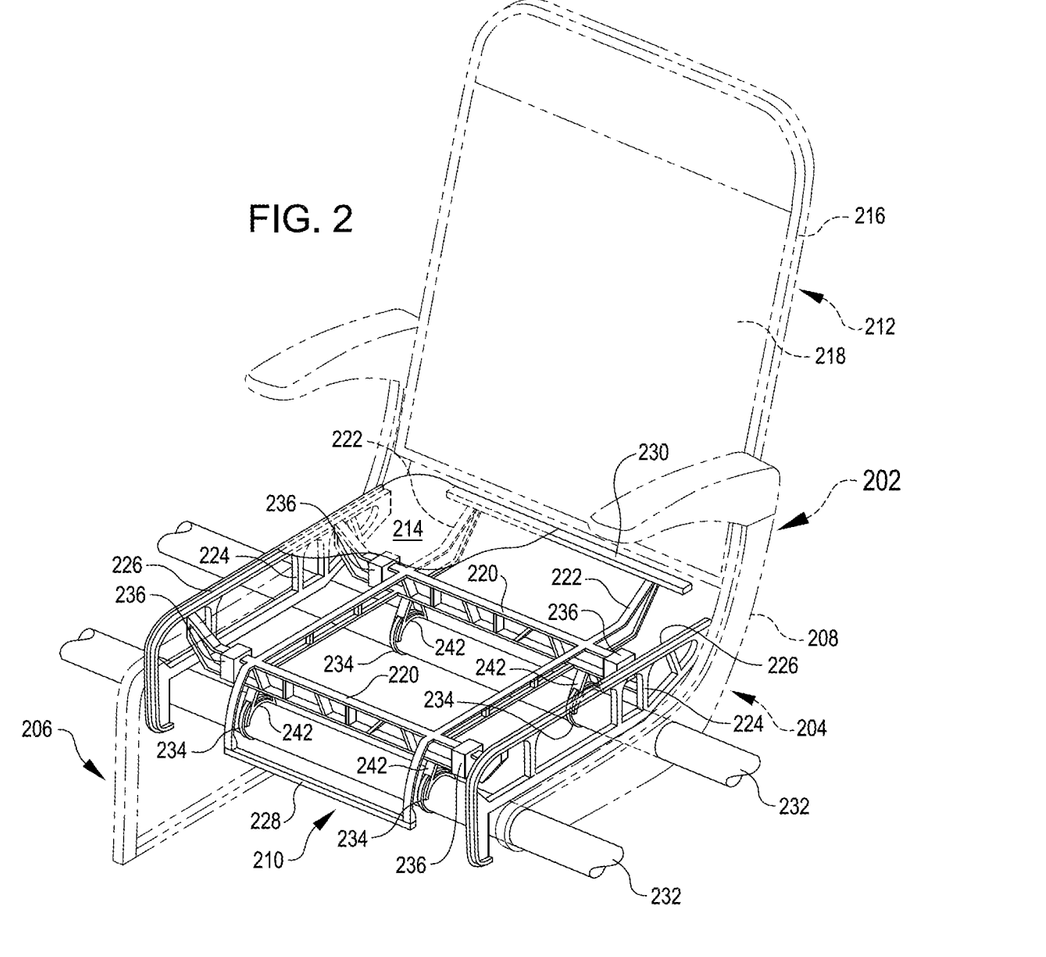
FIG. 2 is a perspective view showing a first example of a passenger support assembly in a passenger seat as shown in FIG. 1.

FIG. 2 is a perspective view showing a first example of a passenger support assembly 210 in a passenger seat 202 as shown in FIG. 1. Unless otherwise noted, like numbers used herein correspond to like elements, e.g. passenger support assemblies 110 and 210. The seat frame 204 can be fixedly attached with a floor of a passenger cabin, and includes a base frame 206 to which the passenger support assembly 210 is connected, and an upper frame 208 attached to the base frame and to which the seat back 212 can be connected. The supported diaphragm 214 is stretched across the passenger support assembly to define seating area of a seat bottom that supports a passenger. The seat back 212 includes a frame 216, optionally including a seat back diaphragm 218 stretched across the frame to define a portion of the seat back that supports the passenger.

According to some embodiments, the supported diaphragm 214 is composed of a elastomeric polymer mesh. In some embodiments, the diaphragm 214 includes an elastomeric substrate or mesh bonded to a polymer, leather, or fabric surface layer that, when supported in tension, resembles the solid surface of an upholstered or otherwise covered foam seat cushion. Suitable elastomers for the substrate include, but are not limited to, PTFE (Polytetrafluoroethylene), RTFE (Reinforced Polytetrafluoroethylene), PEEK (Polyetheretherketone), EPDM (Ethyl-Propylene), BUNA-N(Nitrile, NBR), Acetals (e.g., NYLON), PVC (Polyvinyl chloride), or other comparable elastomers. The physical structure of the elastomeric polymer substrate can be a mesh, e.g. a woven or nonwoven mesh, or can be a perforated substrate patterned to improve flexure and reduce weight.

The passenger support assembly 210 includes lateral structural members 220 and longitudinal structural members 222 defining an expandable inner frame portion of the passenger support assembly. Side frame elements 224 connected with the lateral structural members 220 at a periphery of the expandable inner frame portion of the passenger support assembly define an outer portion of the passenger support assembly, and support the diaphragm 214. Specifically, according to certain embodiments, the side frame elements 224 each include a tracked rim 226 to which sides of the diaphragm 214 attach, and that hold the diaphragm in tension to form a seating surface. In some embodiments, the outer frame portion of the passenger support assembly 210 also include a forward attachment element 228 and an aft attachment element 230 that can connect with the diaphragm to provide additional support and to shape the diaphragm into an appropriate seating surface. In some embodiments, the forward and aft attachment elements 228, 230 are attached directly to the side frame elements 224, or alternatively can be attached to the inner frame portion, e.g. to the longitudinal structural members 222. The supported diaphragm 214 can connected with the forward and/or aft attachment elements 228, 230 be by any suitable connector, typically removable connectors such as touch fasteners (e.g. hook and loop), pins, adhesives, buttons, or the like.

The passenger support assembly 210 connects with the seat frame 204, typically at seat frame tubes 232 that run through the seat frame and can support multiple passenger seats (e.g. passenger seats 102, FIG. 1). According to some embodiments, the passenger support assembly 210 is connected with the seat frame tubes 232 by mounting brackets 242 that can mount to the seat frame tubes and attach thereto, e.g. by any suitable attachment mechanism, including but not limited to seat frame ties 234, rivets, bolts, screws, or other attachment means.

According to at least one embodiment, the passenger support assembly 210 includes width adjustment mechanisms 236 that enable the passenger support assembly to change in width by pushing the side frame elements 224 outward away from each other in order to tension the supported diaphragm 214. Suitable width adjustment mechanisms 236 can include, e.g., overlapping sliding elements attachable with each other at variable positions, screw-driven spacers, or other suitable mechanisms that are known in the art. One specific example that includes overlapping sliding elements is shown FIG. 7, but various adjustment mechanisms can be used. The width adjustment mechanisms 236 may have a cumulative range on the order of at least 8.9 cm (3.5 inches), preferably at least 12.7 cm (5 inches), i.e., for embodiments having pairs of width adjustment mechanisms arranged at opposite ends of the passenger support assembly 210, each width adjustment mechanism may have an individual range approximately half that of the cumulative range. An example of a passenger support assembly 210 that uses fewer width adjustment mechanisms is described below with reference to FIG. 4.

Figure 3:
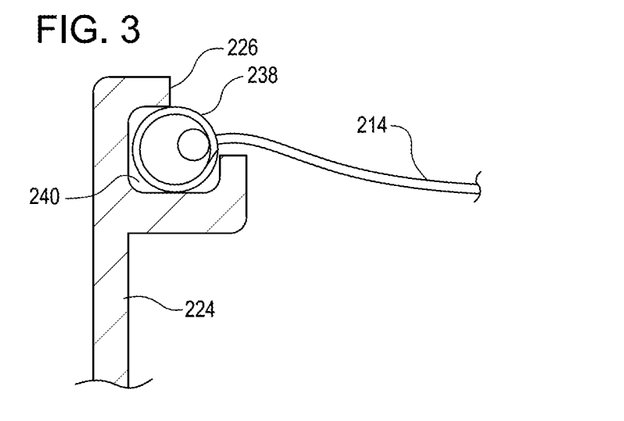
FIG. 3 is a front section view showing detailed aspects of a side frame element connected with a suspended diaphragm of the passenger support assembly shown in FIG. 2.

FIG. 3 is a front section view showing detailed aspects of a side frame element 224 connected with a suspended diaphragm 214 of the passenger support assembly 210 shown in FIG. 2, according to various embodiments of the present disclosure. The supported diaphragm 214 includes features for enabling firm connection to the tracked rim 226 in the side frame element 224. For example, according to some embodiments, the supported diaphragm 214 includes a coil 238, typically metal or other structural material, that is sized to run through a partly enclosed void 240 defined by the tracked rim 226. In alternative embodiments, the supported diaphragm 214 can include a flexible rod or other structural element that runs along or through an edge thereof in order to allow the diaphragm to firmly connect with the tracked rim 226.

Figure 4:
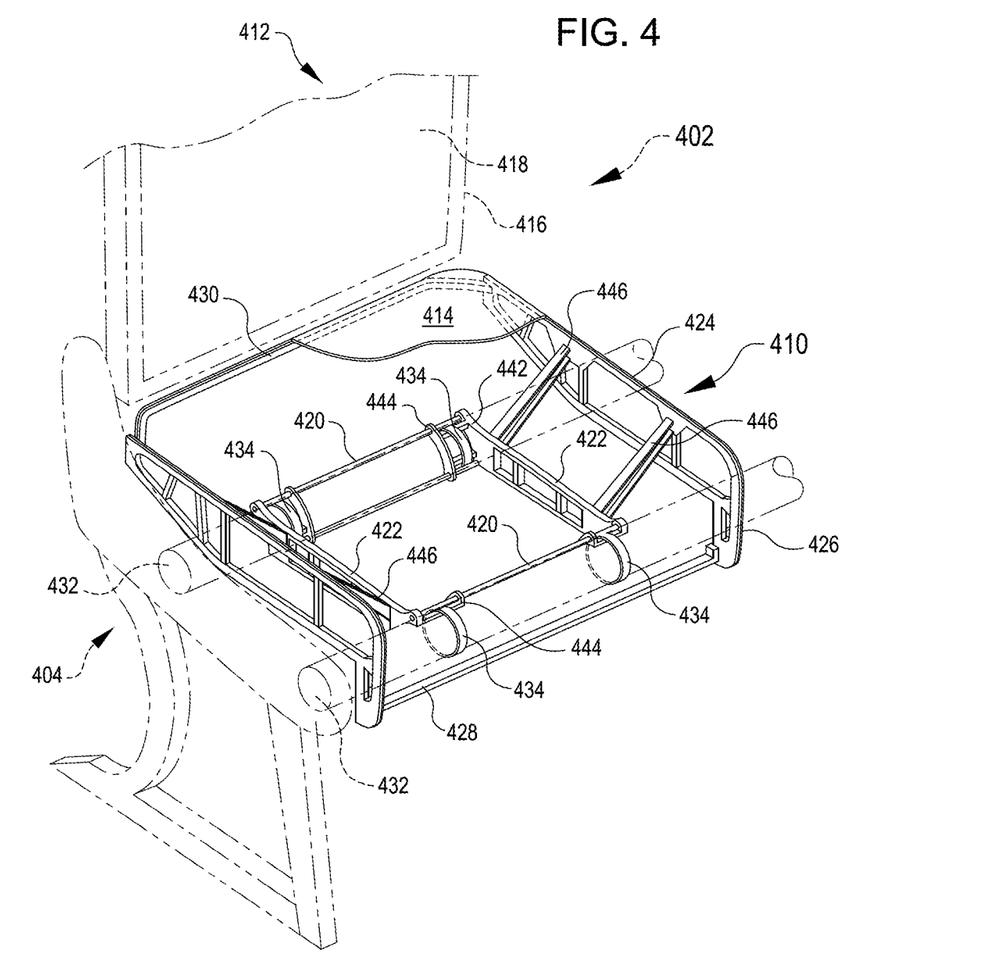
FIG. 4 is a perspective view showing a second example of a passenger support assembly in a passenger seat as shown in FIG. 1, according to certain embodiments of the present disclosure.

FIG. 4 is a perspective view showing a second example of a passenger support assembly 410 in a passenger seat 402 as shown in FIG. 1, according to certain embodiments of the present disclosure. Various components of the passenger support assembly 410 are similar to those described above with respect to passenger support assembly 210. For example, the seat frame 404 can also be fixedly attached with a floor of a passenger cabin, and includes a base frame 406 to which the passenger support assembly 410 is connected, and an upper frame 408 attached to the base frame and to which the seat back 412 can be connected. The supported diaphragm 414 is stretched across the passenger support assembly to define seating area of a seat bottom that supports a passenger. The seat back 412 includes a frame 416, optionally including a seat back diaphragm 418 stretched across the frame to define a portion of the seat back that supports the passenger.

The passenger support assembly 410 includes longitudinal structural members 422 that attach with the passenger seat frame 404 by, e.g., attaching to seat frame tubes 432 of the seat frame. For example, mounting brackets 442 connected with the longitudinal structural elements 422 can mount to the seat frame tubes 432 and be connected thereto, e.g. by seat frame ties 434 or any other suitable attaching means, preferably removably attaching means that can be used to fix the mounting brackets 442 at a variety of positions. Passenger support assembly 410 differs from passenger support assembly 210 in the mechanism by which the passenger support assembly expands. For example, according to some embodiments, the passenger support assembly 410 can change in width by way of spacing elements 420 attached with longitudinal structural members 422, which can include threaded rods or bolts, or any suitable spacer capable of rigidly attaching with rod-receiving elements 444 of the longitudinal structural members 422 in order to space them apart from each other. A total range by which the spacing elements 420 can expand the width of the passenger support assembly can vary, e.g., in some embodiments by at least 8.9 cm (3.5 inches), preferably at least 12.7 cm (5 inches), or more.

Passenger support assembly 410 can include spacing members 446 connected with the longitudinal structural members 422 defining an expandable inner frame portion of the passenger support assembly. Side frame elements 424 can be connected with the spacing members 446 to define an outer portion of the passenger support assembly and support the diaphragm 414. Specifically, according to certain embodiments, the side frame elements 424 each include a tracked rim 426 to which sides of the diaphragm 414 attach, and that hold the diaphragm in tension to form a seating surface. In some embodiments, the outer frame portion of the passenger support assembly 410 also include a forward attachment element 428 and an aft attachment element 430 that can connect with the diaphragm to provide additional support and to shape the diaphragm into an appropriate seating surface. In some embodiments, the forward and aft attachment elements 428, 430 are attached directly to the side frame elements 424, or alternatively can be attached to the inner frame portion, e.g. to the longitudinal structural members 422.

In the examples described above, passenger support assemblies 210, 410 were primarily directed to a fixed seat bottom design, in which the passenger support assemblies do not articulate forward or aft. However, embodiments described herein can also include articulating seat designs. For example, FIG. 5 is a perspective view showing a third example of an articulating passenger support assembly 510 connecting with a reclinable seat back 512, according to certain embodiments of the present disclosure.

Figure 5:
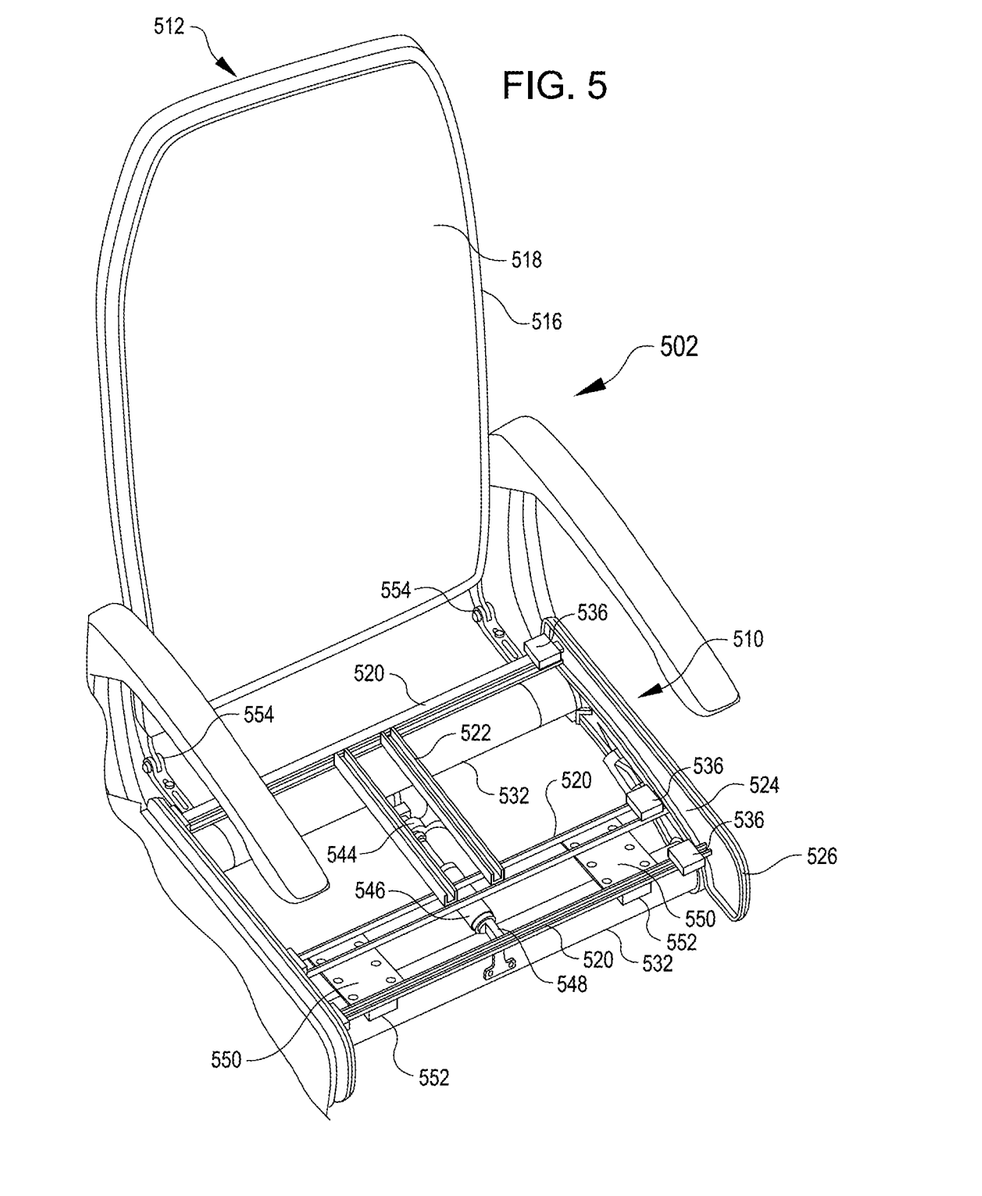
FIG. 5 is a perspective view showing a third example of an articulating passenger support assembly connecting with a reclinable seat back, according to certain embodiments of the present disclosure.

As shown in FIG. 5, passenger seat 502 includes various components that are similar to those described above with respect to passenger support assemblies 210 and 410. For example, passenger support assembly 510 includes a supported diaphragm 514 that stretched across the passenger support assembly to define seating area of a seat bottom that supports a passenger. The passenger support assembly 510 includes lateral structural members 520 that span a width of the passenger support assembly, and longitudinal structural members 522 connected thereto. The lateral structural members 520 that attach to and space apart a pair of side frame elements 524 that define a width of the passenger support assembly.

As described above with reference to passenger support assemblies 210, 410, the side frame elements 524 of passenger support assembly 510 each include a tracked rim 526 that supports and tensions a supported diaphragm 514 that defines a seating surface for a passenger. Width adjustment mechanisms 536 can be connected with the lateral structural members 520, typically near or at the side frame elements 524, to allow the passenger support assembly to change in width, thus increasing or decreasing the width of the seating area and tensioning the supported diaphragm 514.

The passenger support assembly 510 can be slidingly attached to any suitable passenger seat frame. In specific embodiments, the passenger support assembly is slidingly attached to seat frame tubes 532 by articulating means, as follows. In one embodiment, lateral structural members 520 are connected to sliding assemblies 550 that mate with and slide on tracks 552 connected to the frame 504 to allow the passenger support assembly 510 to slide forward and aft along the tracks in response to a passenger reclining the seat 502. In some embodiments, the structural members 520 or 522 can be attached to a recline lock bracket 544 and recline lock 544 that connects to the seat frame tubes 532 or other suitable structural frame member by a second reline lock bracket 548.

Passenger seat 502 can include passenger seat back 512 that is reclinable in conjunction with the articulating passenger support assembly 510. According to some embodiments, a pivoting linkage 554 can connect the passenger support assembly 510 with the seat back 512 to enable the passenger support assembly and seat back to move in concert when the seat 502 is reclined. The passenger seat back 512 can include a seat back frame 516 and a supported seat back diaphragm 518 therein for supporting a passenger.

Figure 6:
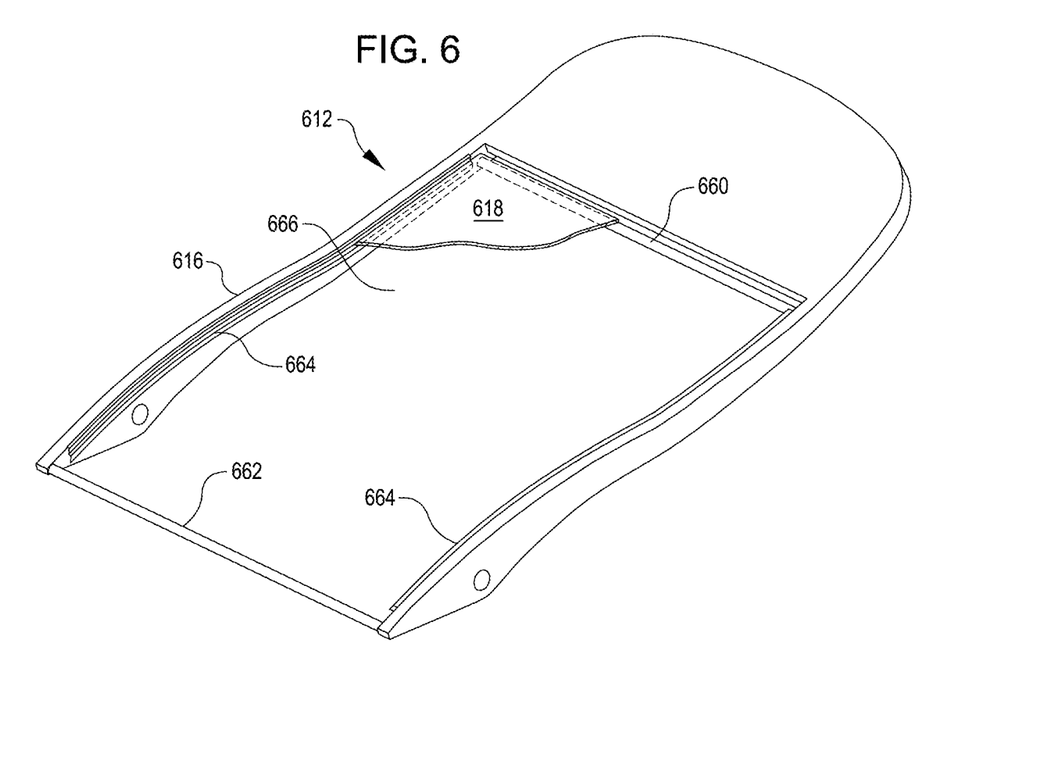
FIG. 6 is a perspective view showing an example of a passenger seat back that includes a suspended seat back diaphragm for use in a passenger seat, as shown in FIG. 1.

FIG. 6 is a perspective view showing an example of a passenger seat back 612 that includes a suspended seat back diaphragm 618 for use in a passenger seat, as shown in FIGS. 1-2 and 4-5. The seat back 612 is attachable with any suitable seat frame, including in fixed and reclinable configurations with or without an articulating passenger support assembly. The seat back 612 can include a seat back frame 616 having a void 666 through the seat back frame with a pair of opposing tracked rims 664 that are configured to retain and tension the supported seat back diaphragm 618. The seat back diaphragm 618 can be attached at an upper and lower extend to a respective upper attachment element 660 and lower attachment element 662 by any suitable connector, typically removable connectors such as touch fasteners (e.g. hook and loop), pins, adhesives, buttons, or the like.

Figure 7:
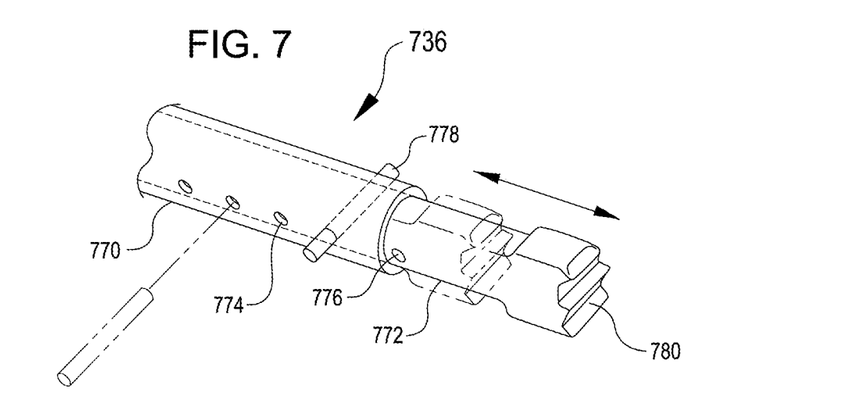
FIG. 7 is a detailed perspective view showing an example of an adjustment mechanism for use in a passenger support assembly, as shown in FIGS. 1-5.

FIG. 7 is a detailed perspective view illustrating a specific example of an adjustment mechanism 736 that can be used in conjunction with any of the passenger support assemblies described herein to adjust the passenger support assembly width. The adjustment mechanism 736 includes overlapping outer structure 770 that mates with an inner structure 772. When positioned at specific degrees of extension, an outer set of voids 774 align with an inner set of voids 776 that can be used, e.g. by insertion of a pin, bolt or other connector 778. Adjustment mechanism ends 780 can extend to connect with other parts of the adjustment mechanism (e.g., from FIG. 2, lateral structural elements 220, side frame elements 224, etc.). In some embodiments, the inner set of voids 776 can be replaced by, e.g. integrating a spring-loaded pin with the inner structure 772, or similar. The adjustment mechanism 736 may be positionable at set increments to provide any of the overall passenger support assembly widths described herein. Alternatively, the adjustment mechanism 736 can have a continuous range, e.g. by use of a screw-driven spacer. In some alternative embodiments, variability in the width of the passenger support assembly can be achieved by producing spacing elements positionable as the adjustment mechanism at various specific widths and installing the correctly sized part to match the desired overall width.

The unique structures of the passenger support assemblies 110, 210, 310, 410, 510 described herein allow for a flexible approach to installation of the passenger support assemblies in a passenger seat that can accommodate a variety of desired seat widths and configurations. For example, according to some embodiments, a passenger support assembly can be installed in a passenger seat by connecting an expandable inner frame with the seat frame of a passenger seat assembly, connecting an outer frame comprising first and second side frame elements with the expandable inner frame, and connecting a diaphragm with the first and second side frame elements of the outer frame. The expandable inner frame and outer frame can then be expanded until the outer frame places the diaphragm in tension, such that the diaphragm forms a seating surface. The inner frame and outer frame may also be integrally connected with each other, or attached prior to installation of the passenger support assembly with the seat frame of the passenger seat. In some embodiments, additional front and rear outer frame elements can be connected with the first and second side frame elements and orthogonal to the first and second side frame elements; and the diaphragm can then be attached thereto.

The step of expanding the passenger support assembly to tension the supported diaphragm can include, according to some embodiments, slidingly connecting mounting brackets of the passenger support assembly (e.g., mounting brackets 442, FIG. 4) with a pair of tubular supports (e.g. tubular supports 432) of the seat frame then separating the attachment elements from each other along the pair of tubular supports. Alternatively, expanding the passenger support assembly can include fixedly connecting mounting brackets of the passenger support assembly (e.g. mounting brackets 242, FIG. 2) with tubular supports (e.g. 232) and then expanding a set of adjustment mechanisms (e.g. 236, FIG. 2). Connecting the diaphragm with the first and second side frame elements of the outer frame can include sliding opposite first and second ends of the diaphragm through respective first and second slots in the first and second side frame elements (e.g., tracked rim 226, 326, 426) of the outer frame until the diaphragm spans substantially all of a length of the outer frame.

Structural elements of the seats (e.g. passenger seats 102, frame 104, passenger support assembly 110, seat back 112, FIG. 1) or corresponding components described with reference to FIGS. 2-6, as well as any intervening structural elements or attachment elements therein, may be formed of materials including but not limited to aluminum, stainless steel, aramid fibers, polycarbonate, polypropylene, other metallic materials, composite materials, or other similar materials.

In the following, further examples are described to facilitate the understanding of the invention:

Example A

A passenger support assembly for a passenger seat, the assembly comprising: an expandable inner frame comprising attachment elements configured to attach the passenger support assembly with a seat frame and an expansion mechanism configured to allow the expandable inner frame to change in width; an outer frame comprising two side frame elements connected with the expandable inner frame and extending beyond the expandable inner frame, the outer frame configured to change in width in response to a change in width of the expandable inner frame; and a diaphragm held in tension by the two side frame elements of the outer frame to define a seating surface.

Example B

The assembly of any of the preceding or subsequent examples, wherein the attachment elements are configured to connect directly to a pair of tubular supports of the seat frame at a seat bottom position.

Example C

The assembly of any of the preceding or subsequent examples, wherein the attachment elements comprise a sliding linkage configured to allow the expandable inner frame to slidingly attach with the seat frame so that, when the assembly is attached to the seat frame, the assembly can articulate forward and aft with respect to the seat frame.

Example D

The assembly of any of the preceding or subsequent examples, wherein the attachment elements further comprise an articulating linkage positioned at an aft extent of the assembly and configured to attach the assembly with a lower extent of a passenger seat back.

Example E

The assembly of any of the preceding or subsequent examples, wherein the seating surface defined by the diaphragm is adjustable by at least 8.9 cm (3.5 inches), preferably at least 12.7 cm (5 inches), in response to varying the width of the outer frame.

Example F

The assembly of any of the preceding or subsequent examples, wherein the seating surface defined by the diaphragm is adjustable in width from 39.4 cm to 47 cm (15.5 to 18.5 inches), preferably from less than 38 cm to at least 50 cm (15-20 inches).

Example G

The assembly of any of the preceding or subsequent examples, wherein the diaphragm comprises a elastomeric polymer mesh.

Example H

The assembly of any of the preceding or subsequent examples, wherein the diaphragm comprises an elastomeric substrate bonded to a polymer, leather, or fabric surface layer

Example I

The assembly any of the preceding or subsequent examples, wherein: the diaphragm further comprises first and second metal coils connected therewith at first and second ends of the diaphragm; and the diaphragm is connected with the first and second side frame elements by insertion of the first and second metal coils within slots in the first and second side frame elements, respectively.

Example J

The assembly of any of the preceding or subsequent examples, wherein: the outer frame further comprises a front outer frame element and a rear outer frame element positioned between the two side frame elements and orthogonal to the two side frame elements at a forward position and an aft position, respectively; and the diaphragm is further connected with the outer frame at the front outer frame element and rear outer frame element.

Example K

The assembly of any of the preceding examples, wherein the diaphragm is removably connected with the front outer frame element and rear outer frame element by one or more removable touch fasteners, and removably connected with the outer frame by being slidingly attached slots in the two side frame elements.

Example L

A passenger seat, comprising: a seat frame configured to attach to a passenger compartment floor; and a passenger support assembly according to any of the preceding examples connected with the seat frame.

Example M

The passenger seat of any of the preceding or subsequent examples, wherein the passenger support assembly is a seat bottom assembly.

Example N

The passenger seat of any of the preceding or subsequent examples, wherein the seat frame comprises a pair of tubular supports and the attachment elements are adjustably attached to each other along the pair of tubular supports such that a width of the expandable inner frame can be varied by moving the attachment elements toward or away from each other along the pair of tubular supports.

Example O

The passenger seat of any of the preceding or subsequent examples, wherein the passenger support assembly is an articulating seat bottom assembly, and further comprising: an articulating linkage connected with the expandable inner frame and with the seat frame, the articulating linkage configured to allow the passenger support assembly to articulate with respect to the seat frame.

Example P

The passenger seat of any of the preceding or subsequent examples, further comprising a seat back connected with the seat frame, the seat back comprising first and second side tracks and a second diaphragm held in tension between the first and second side tracks to define a seat back surface.

Example Q

A method of installing a passenger support assembly according to any of the preceding examples A-K in a passenger seat, the method comprising: connecting the expandable inner frame with a seat frame of a passenger seat assembly by connecting attachment elements of the expandable inner frame with the seat frame; connecting the outer frame comprising first and second side frame elements with the expandable inner frame; connecting the diaphragm with the first and second side frame elements of the outer frame; and expanding the expandable inner frame and outer frame until the outer frame places the diaphragm in tension, such that the diaphragm forms a seating surface.

Example R

The method of any of the preceding or subsequent examples, further comprising: attaching front and rear outer frame elements with the first and second side frame elements and orthogonal to the first and second side frame elements; and attaching the diaphragm with the front and rear outer frame elements.

Example S

The method of any of the preceding or subsequent examples, wherein: connecting the expandable inner frame with the seat frame comprises slidingly connecting each of the attachment elements with a pair of tubular supports of the seat frame; and expanding the expandable inner frame comprises separating the attachment elements from each other along the pair of tubular supports.

Example T

The method of any of the preceding examples, wherein connecting the diaphragm with the first and second side frame elements of the outer frame comprises: sliding opposite first and second ends of the diaphragm through respective first and second slots in the first and second side frame elements of the outer frame until the diaphragm spans substantially all of a length of the outer frame.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger support assembly for a passenger seat, the assembly comprising:
   an expandable inner frame comprising attachment elements configured to attach the passenger support assembly with a pair of tubular supports of a seat frame and an expansion mechanism configured to allow the expandable inner frame to change in width by movement of the attachment elements toward or away from each other when the attachment elements are attached with the pair of tubular supports;
   an outer frame comprising first and second side frame elements connected with the expandable inner frame and extending beyond the expandable inner frame, the outer frame configured to change in width in response to a change in width of the expandable inner frame; and
   a diaphragm held in tension by the first and second side frame elements of the outer frame to define a seating surface.

2. The assembly of claim 1, wherein the attachment elements are configured to connect directly to the pair of tubular supports of the seat frame at a seat bottom position.

3. The assembly of claim 1, wherein the attachment elements comprise a sliding linkage configured to allow the expandable inner frame to slidingly attach with the seat frame so that, when the assembly is attached to the seat frame, the assembly can articulate forward and aft with respect to the seat frame.

4. The assembly of claim 3, wherein the attachment elements further comprise an articulating linkage positioned at an aft extent of the assembly and configured to attach the assembly with a lower extent of a passenger seat back.

5. The assembly of claim 1, wherein the seating surface defined by the diaphragm is adjustable by at least 8.9 cm (3.5 inches), preferably at least 12.7 cm (5 inches), in response to varying the width of the outer frame.

6. The assembly of claim 1, wherein the seating surface defined by the diaphragm is adjustable in width from 39.4 cm to 47 cm (15.5 to 18.5 inches), preferably from less than 38 cm to at least 50 cm (15-20 inches).

7. The assembly of claim 1, wherein the diaphragm comprises a elastomeric polymer mesh.

8. The assembly of claim 1, wherein the diaphragm comprises an elastomeric substrate bonded to a polymer, leather, or fabric surface layer.

9. The assembly of claim 1, wherein:
   the diaphragm further comprises first and second metal coils connected therewith at first and second ends of the diaphragm; and
   the diaphragm is connected with the first and second side frame elements by insertion of the first and second metal coils within slots in the first and second side frame elements, respectively.

10. The assembly of claim 1, wherein:
    the outer frame further comprises a front outer frame element and a rear outer frame element positioned between the first and second side frame elements and orthogonal to the side frame elements at a forward position and an aft position, respectively; and
    the diaphragm is further connected with the outer frame at the front outer frame element and rear outer frame element.

11. The assembly of claim 10, wherein the diaphragm is removably connected with the front outer frame element and rear outer frame element by one or more removable touch fasteners, and removably connected with the outer frame by being slidingly attached with slots in the side frame elements.

12. A passenger seat, comprising:
    a seat frame configured to attach to a passenger compartment floor; and
    a passenger support assembly connected with the seat frame, the passenger support assembly comprising:
    an expandable inner frame comprising attachment elements configured to attach the passenger support assembly with a pair of tubular supports of the seat frame and an expansion mechanism configured to allow the expandable inner frame to change in width by movement of the attachment elements toward or away from each other when the attachment elements are attached with the pair of tubular supports;
    an outer frame comprising two side frame elements connected with the expandable inner frame and extending beyond the expandable inner frame, the outer frame configured to change in width in response to a change in width of the expandable inner frame; and
    a diaphragm held in tension by the two side frame elements of the outer frame to define a seating surface.

13. The passenger seat of claim 12, wherein the passenger support assembly is a seat bottom assembly.

14. The passenger seat of claim 12, wherein the passenger support assembly is an articulating seat bottom assembly, and further comprising:
    an articulating linkage connected with the expandable inner frame and with the seat frame, the articulating linkage configured to allow the passenger support assembly to articulate with respect to the seat frame.

15. The passenger seat of claim 12, further comprising a seat back connected with the seat frame, the seat back comprising first and second side tracks and a second diaphragm held in tension between the first and second side tracks to define a seat back surface.

16. A method of installing a passenger support assembly in a passenger seat, the method comprising:
    connecting an expandable inner frame with a seat frame of a passenger seat assembly by connecting attachment elements of the expandable inner frame with a pair of tubular supports of the seat frame;

connecting an outer frame comprising first and second side frame elements with the expandable inner frame;

connecting a diaphragm with the first and second side frame elements of the outer frame; and expanding the expandable inner frame and outer frame by moving the attachment elements of the inner frame away from each other along the tubular supports until the outer frame places the diaphragm in tension, such that the diaphragm forms a seating surface.

17. The method of claim 16, further comprising:

attaching front and rear outer frame elements with the first and second side frame elements and orthogonal to the first and second side frame elements; and attaching the diaphragm with the front and rear outer frame elements.

18. The method of claim 16, wherein:

connecting the expandable inner frame with the seat frame comprises slidingly connecting each of the attachment elements with a pair of tubular supports of the seat frame; and expanding the expandable inner frame comprises separating the attachment elements from each other along the pair of tubular supports further comprising:

attaching front and rear outer frame elements with the first and second side frame elements after expanding the expandable inner frame.

19. The method of claim 16, wherein connecting the diaphragm with the first and second side frame elements of the outer frame comprises:

sliding opposite first and second ends of the diaphragm through respective first and second slots in the first and second side frame elements of the outer frame until the diaphragm spans substantially all of a length of the outer frame.

20. The passenger seat of claim 12, further comprising front and rear outer frame elements connected with the first and second side frame elements at a front of the seating surface and at a rear of the seating surface, respectively.

\* \* \* \* \*